United States Patent [19]
Rawlins et al.

[11] 3,921,065
[45] Nov. 18, 1975

[54] MAGNETIC SENSOR FOR DETECTING FLAWS ON ONE SURFACE OF ROLLER BEARING

[76] Inventors: Wendell G. Rawlins, 1563 Belle, Topeka, Kans. 66604; Gary M. Hoffsommer, R.F.D. No. 1, Quenemo, Kans. 66528; Charles W. Artzer, 631 Freeman, Topeka, Kans. 66616; Cecil H. Parrett, 925 N.E. 43rd Road, Topeka, Kans. 66617

[22] Filed: Feb. 15, 1974

[21] Appl. No.: 442,880

[52] U.S. Cl. ................................................. 324/37
[51] Int. Cl.² ......................................... G01R 33/12
[58] Field of Search ................................ 324/37, 40

[56] References Cited
UNITED STATES PATENTS

| | | | |
|---|---|---|---|
| 2,587,631 | 3/1952 | Kuehne | 324/34 R |
| 2,994,032 | 7/1961 | Hansen | 324/37 |
| 3,234,457 | 2/1966 | Sower et al. | 324/40 |
| 3,473,110 | 10/1969 | Hardin et al. | 324/40 |
| 3,553,570 | 1/1971 | Skubiak et al. | 324/37 |
| 3,718,855 | 2/1973 | Rogel et al. | 324/37 |
| 3,739,262 | 6/1973 | Seekins | 324/40 |

*Primary Examiner*—Robert J. Corcoran
*Attorney, Agent, or Firm*—Clelle W. Upchurch

[57] ABSTRACT

A bearing tester for electromagnetically detecting flaws in a surface of a bearing. The tester includes a probe having a sensor that moves between the cage and inner race of the bearing. The sensor is automatically vertically moved across the surface of the inner race to detect flaws and is positioned laterally with an adjustment mechanism to fit between the cage and inner race. Vertical movement of the sensor is automatically accomplished through the use of circuitry that generates a signal corresponding to the vertical displacement of the probe and compares the signal to two predetermined thresholds representing, respectively, first and second vertical positions corresponding to the upper and lower parts of the inner race. Movement of the probe to the first and second vertical positions automatically energizes and deenergizes, respectively, a motor which drives the probe and rotates the inner race. The sensor includes a barrel and centerpiece made of relay core material, together with a coil wound about the centerpiece. The inductance of the coil is proportional to the strength of the magnetic loop formed by the barrel, centerpiece and inner race. A change in inductance resulting from a flaw in the surface of the inner race is detected and a signal is generated proportional to such change to provide visual information of the flaw.

5 Claims, 11 Drawing Figures

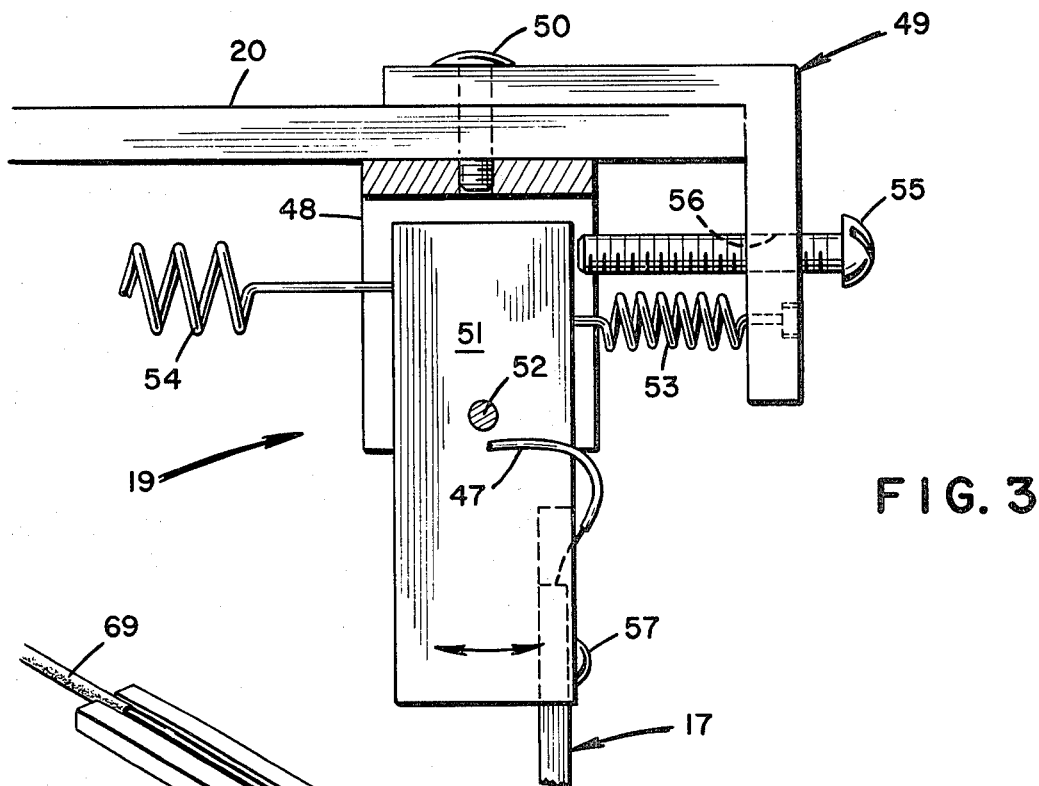
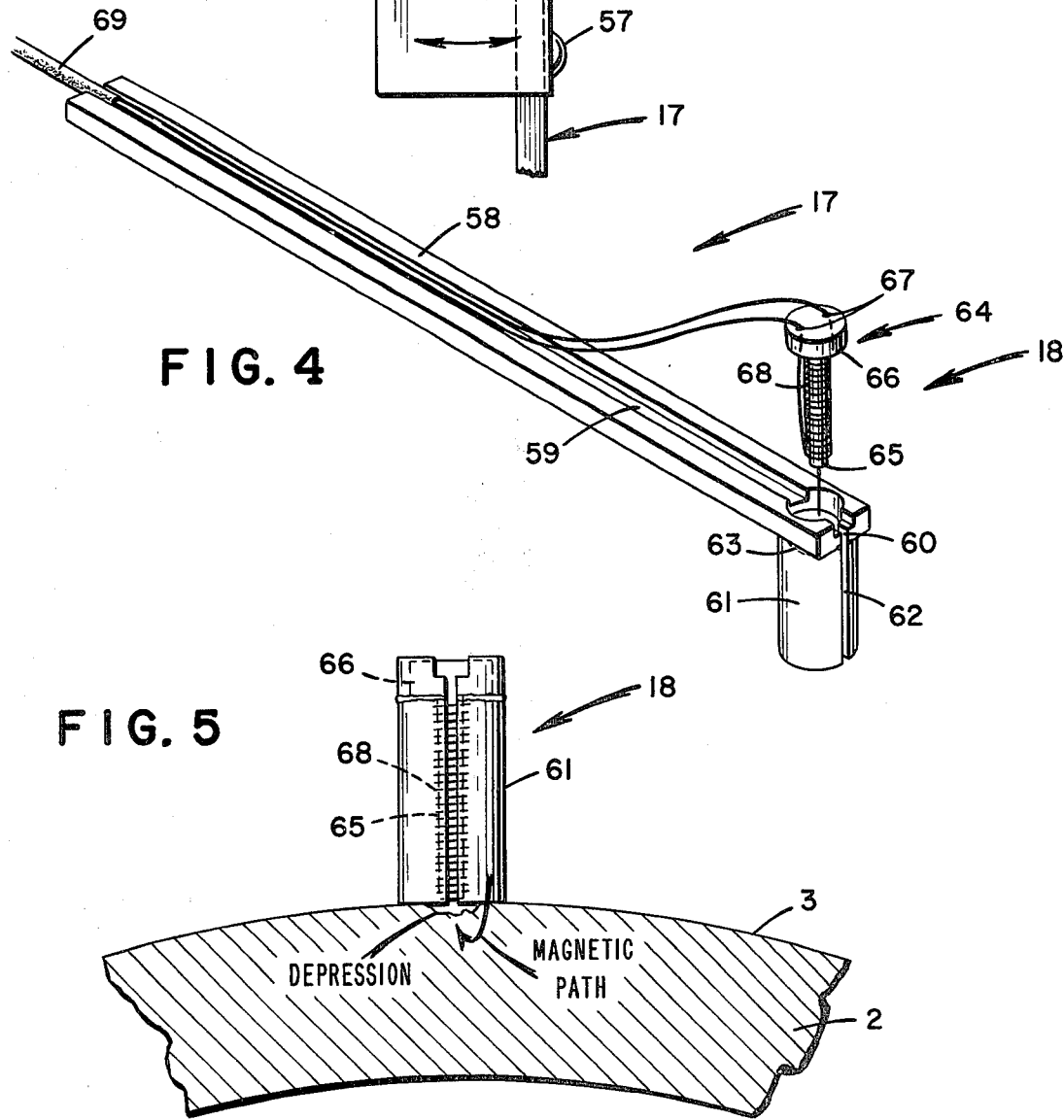

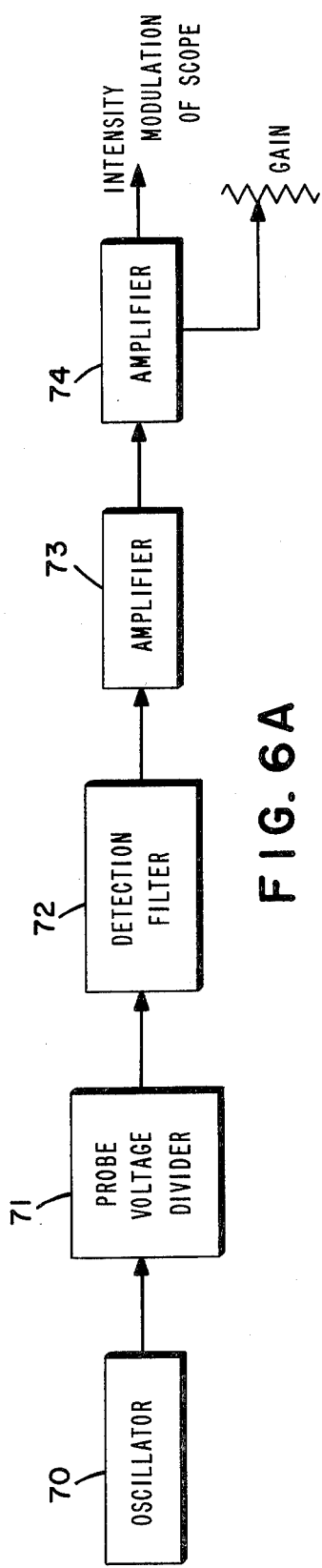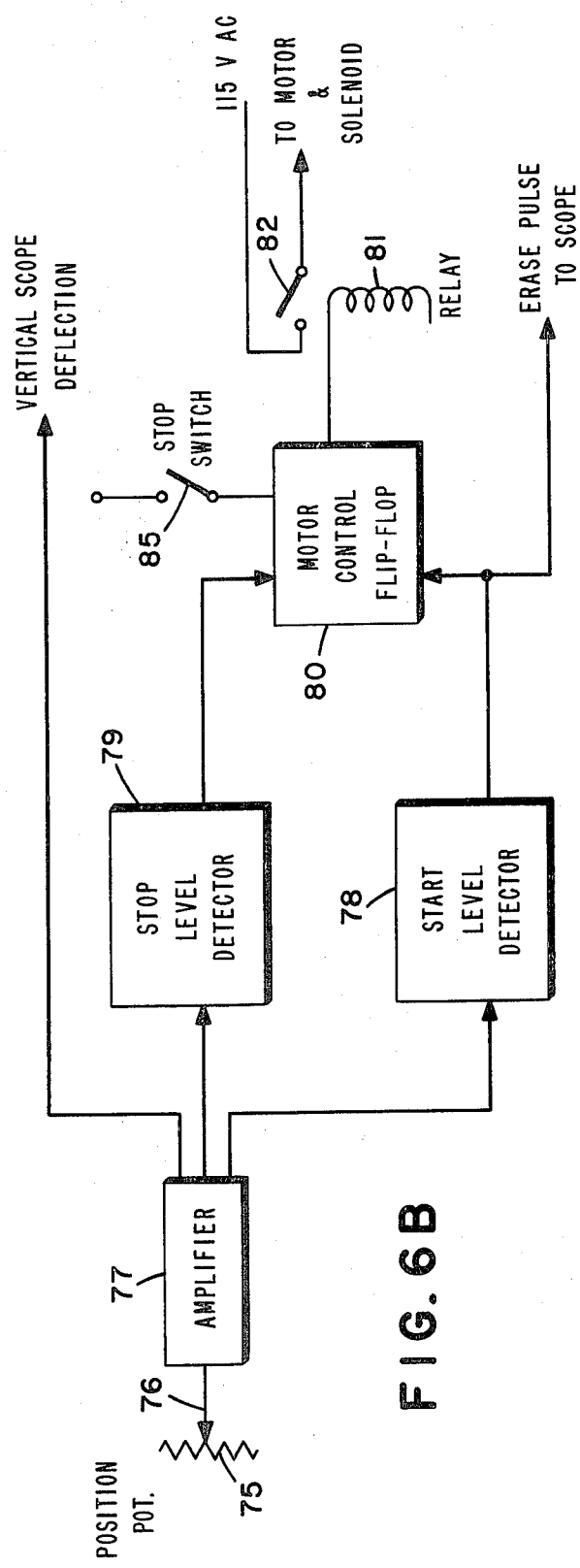

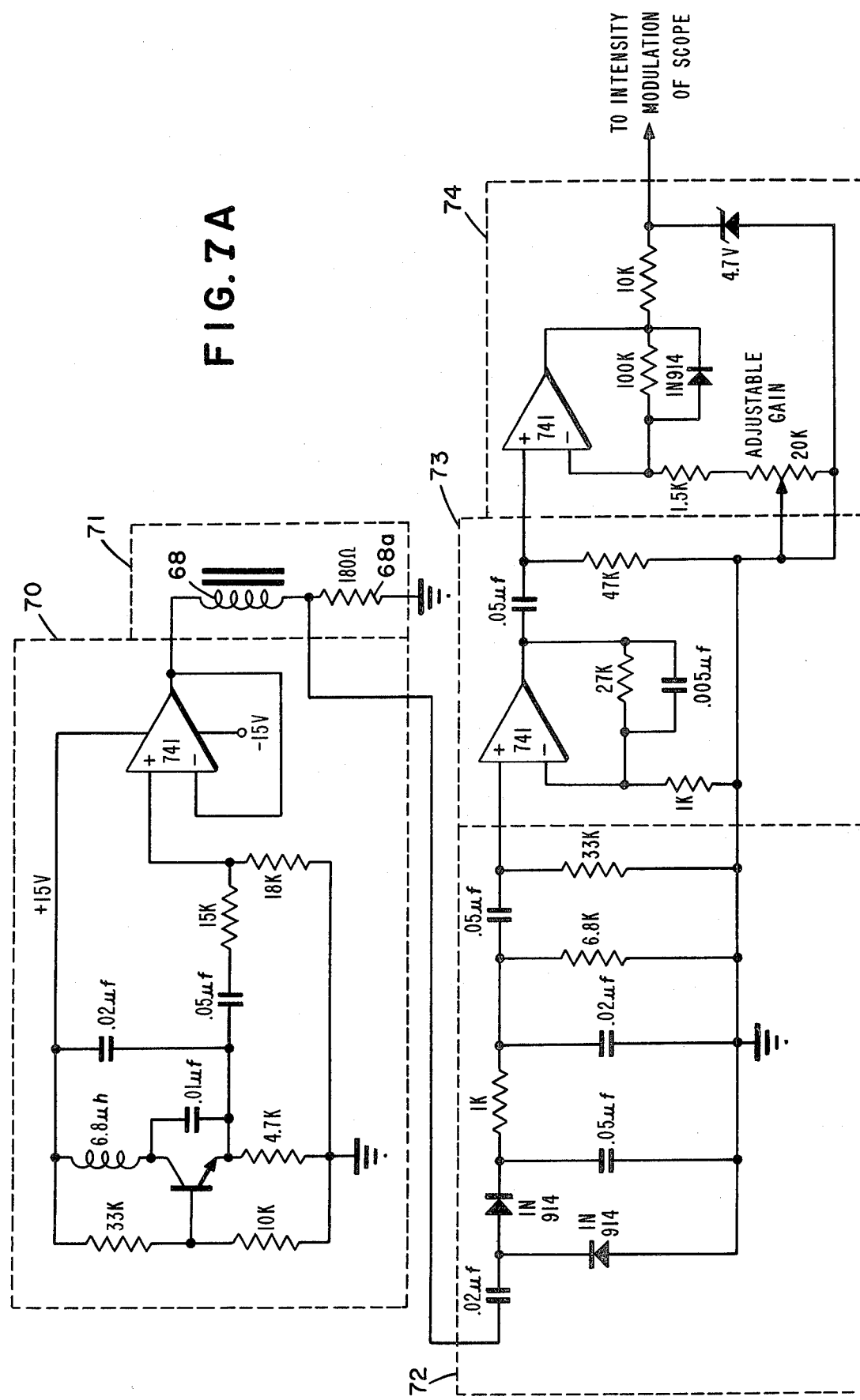

MAGNETIC SENSOR FOR DETECTING FLAWS ON ONE SURFACE OF ROLLER BEARING

BACKGROUND OF THE INVENTION

This invention relates to apparatus for detecting flaws in objects and, more particularly, to a non-destructive, electromagnetic detection system for detecting defects on the inner race of roller bearings.

In the manufacture and use of metal structures it may be of considerable importance that these objects be entirely free of defects or flaws. For example, relatively large roller bearings, which are employed in the railroad industry, would be unsuitable for use due to safety and other factors if they contained any substantial imperfections.

In order to provide optimum railroad service, it is essential that the large roller bearings be tested for defects both prior to being first placed in use and after a period of operation. Any imperfections in the bearings may be serious, especially if they appear on the outer surface of the inner race. Therefore, appropriate testing procedures must be taken to ensure that such surfaces do not include flaws that would require repair or replacement of the race.

Heretofore it has not been possible to quickly, economically and precisely perform the necessary testing procedures. This is due to the structure of the roller bearing which includes an inner race, a cage that is concentric about the race and a plurality of rollers that are positioned in apertures in the cage and that roll on the outer surface of the inner race. The inner race does not normally separate from the cage and rollers; therefore, with prior techniques, in order to examine the outer surface of the inner race it is necessary to remove the cage and rollers from the inner race. In addition to being time consuming and expensive, such removal may cause marring of the very surface which is to be tested. Furthermore, during re-assembly, flaws may be placed on the surface of the inner race which has been examined and these would go undetected.

The present invention has the advantage of enabling the surface of the inner race to be tested without requiring disassembly of the bearing, thereby making the examining procedure more economical and obviating problems relating to separation of the inner race from the cage and rollers. Furthermore, the inner race may be more accurately and rapidly tested. In addition, the apparatus and testing procedure of the present invention is substantially fully automatic.

SUMMARY OF THE INVENTION

A test probe including a sensor, having dimensions enabling it to fit between the inner race and cage of a roller bearing, is mechanically connected to a motor for driving the sensor vertically across the width of the outer surface of the inner race and for rotating such race. Start and stop circuitry is provided for causing the motor to automatically commence movement of the probe when the sensor is near the top lip of the bearing and to automatically halt movement of the probe when the sensor is near the lower lip of the bearing. The circuitry also includes means for varying the automatic start and stop positions of the probe if, for example, only a part of the outer surface of the inner race is to be tested. In addition, an adjustment mechanism is used to set the lateral position of the probe by moving it backward or forward so that it may enter the bearing between the inner race and the cage without contacting either one.

The probe includes a stainless steel shank that has a relatively small, cylindrical barrel silver soldered to the shank at one end. The barrel, together with a centerpiece which fits in the barrel, is made from relay core material and the centerpiece is wound with wire that is led out along the length of the shank. The probe is connected to a resistor which together comprise a voltage divider that is provided with a high frequency input from an oscillator. The voltage divider, in turn, is connected to oscilliscope.

In operation, the lateral position of the probe is adjusted to enable it to fit between the inner race and the cage. As the sensor is manually moved vertically to a predetermined position with respect to the top part of the bearing, a motor is automatically turned on to vertically drive the sensor on the outer surface of the inner race and to rotate the race. If the sensor comes in contact with a flaw, such as a depression in the surface in the form of, for example, what is known as a brinell or spall defect, a magnetic loop about the sensor and inner race is affected. The inductance of the coil changes with the completeness of the magnetic path and, therefore, the output of the voltage divider to which is applied the high frequency from the oscillator, also changes. This output, after being filtered and amplified, is fed to the oscilloscope which displays a picture of the defect. When the sensor is vertically moved to a predetermined position with respect to the lower lip of the bearing, the motor is deenergized thereby stopping further movement of the probe.

BRIEF DESCRIPTION OF THE DRAWINGS

FIG. 3 is a partial section of the adjustment mechanism of FIG. 1.

FIG. 4 is an isometric of the probe with an exploded perspective of part of the sensor.

FIG. 5 is a diagrammatic illustration of the manner in which flaws on a surface may be detected.

FIGS. 6A, 6B and 6C are block diagrams showing the several circuits used for detecting imperfections, automatically moving the probe and operating the oscilloscope.

FIGS. 7A, 7B and 7C are schematic diagrams of the circuitry shown in FIGS. 6A, 6B and 6C, respectively.

DETAILED DESCRIPTION OF THE INVENTION

Figure 1:
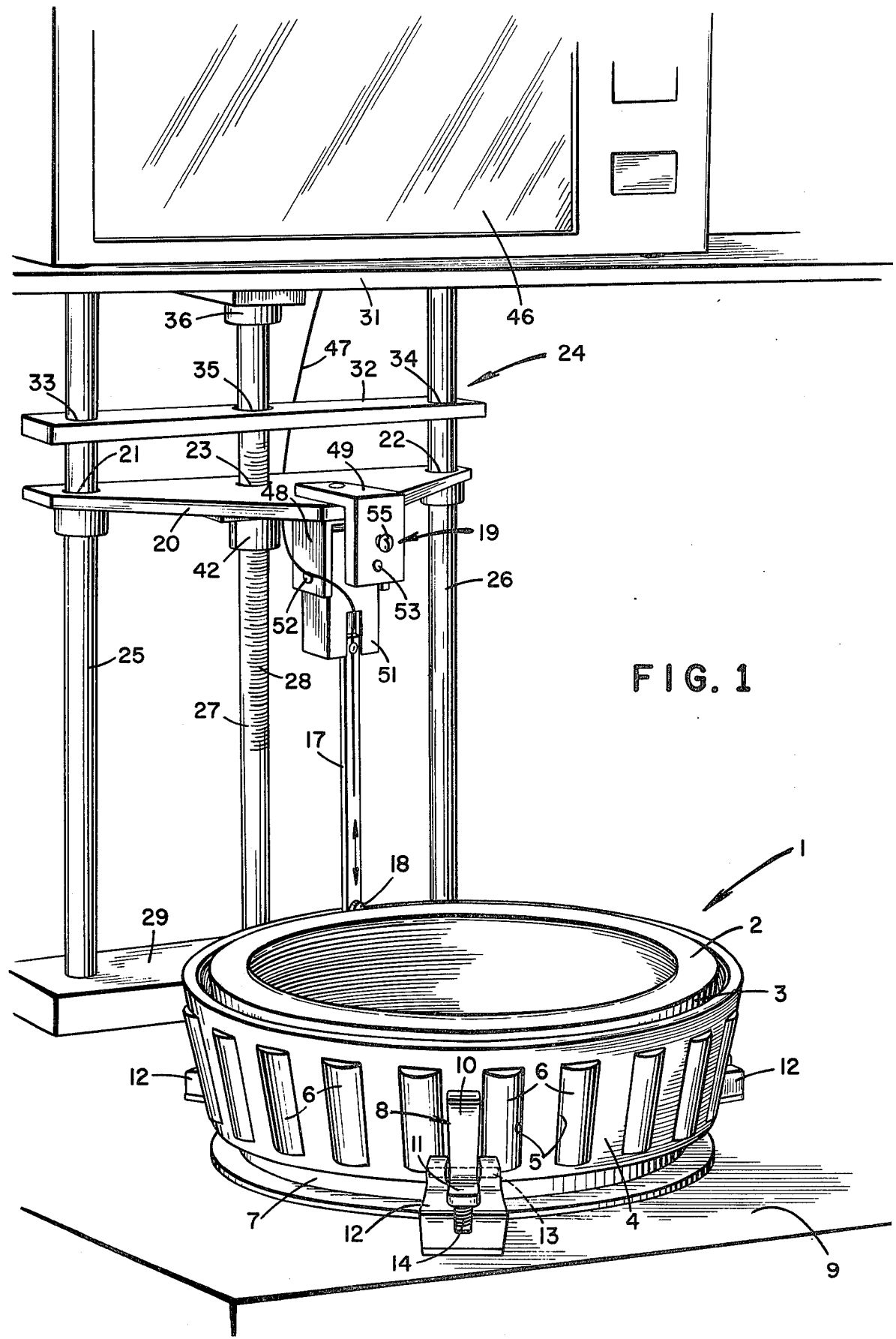
FIG. 1 is a perspective of the bearing tester of the present invention with a part of the bearing in position to be examined.
Figure 2:
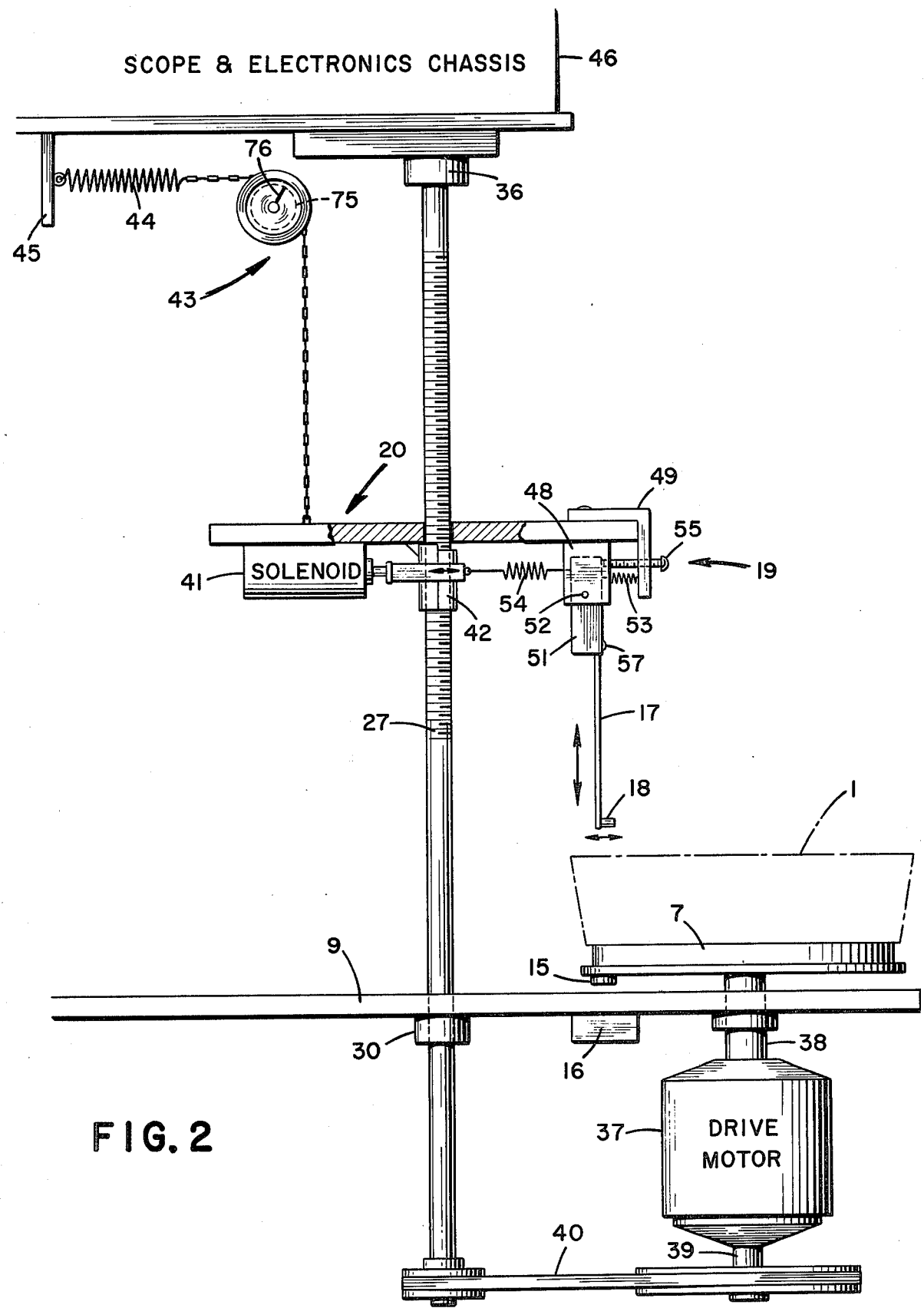
FIG. 2 illustrates schematically the lowering and elevating mechanism of FIG. 1.

In FIGS. 1 and 2 there is shown part of a commercial roller bearing 1 in position for testing with the apparatus of the present invention. The roller bearing 1 includes a hollow, cylindrical inner race 2 having an outer surface 3 and a hollow, cylindrical cage 4 which is concentric about the inner race 2. Cage 4 is spaced apart a small distance from inner race 2 and includes a plurality of rectangular apertures 5 into which fit cylindrical rollers 6 that make contact with and roll on the outer surface 3 of inner race 2. Outer surface 3 is the part of the bearing 1 to be examined for imperfections.

The roller bearing 1 is positioned with a bearing holder which includes a rotatable, circular platform 7 on which the inner race 2 is seated, and a plurality of bearing indices 8, located on table 9, equally spaced about the periphery of cage 4. Each index 8 includes an L-shaped member having a vertical leg 10 and a horizontal leg 11 resting on a support 12 located on the table 9. The vertical leg 10 rests against the cage 4 between the rollers 6. The L-shaped member is pivotable about a pin 13 and is spring loaded with a spring 14 connected between the horizontal leg 11 and support 12 to urge leg 10 against cage 4. Indices 8, therefore, aid in properly aligning cage 4 and maintaining it stationary.

A magnetic protrusion 15 is connected to the underside of platform 7 to rotate therewith. A magnetic pickup 16, located on the underside and extending through table 9, is vertically aligned with protrusion 15. As will be more fully described, these two elements are used to initiate the horizontal sweep of an oscilloscope.

A probe 17 including a sensor 18 is connected to an adjustment mechanism 19 which is used to vary the lateral position of the probe 17 backward and forward so as to enable it to enter the space between the inner race 2 and cage 4 without contacting either. Adjustment mechanism 19 is attached to a relatively thin, flat, vertically movable support plate 20 which has two, circular apertures 21, 22 located near opposite sides of plate 20 and a circular aperture 23 intermediate the apertures 21, 22.

Support plate 20 is vertically movable along a frame generally noted at 24. Frame 24 includes a pair of spaced apart, cylindrical guide rails 25, 26 and a cylindrical drive rod 27 located intermediate the guide rails 25, 26 and includes threads 28 along an intermediate length thereof. One end of each of the guide rails 25, 26 is fixed to bottom plate 29 while one end of drive rod 27 is rotatably mounted on, and extends through, plate 29 and table 9 via ball bearings 30. The other end of each guide rod 25, 26 is fixed to upper support plate 31. A stationary plate 32, having two circular apertures 33, 34 coaxial with apertures 21, 22 of vertically movable plate 20 and a third circular aperture 35 coaxial with aperture 23, is located between bottom plate 29 and upper plate 31 near the latter to provide stability for the frame 24.

Guide rods 25, 26 extend through coaxial apertures 21, 22 and 33, 34, respectively. Guide rods 25, 26 are fixedly connected to stationary plate 32 at the apertures 33, 34 while the apertures 21, 22 are slightly larger than guide rods 25, 26 to enable plate 20 to vertically move therealong, as is aperture 23 with respect to drive rod 27.

Drive rod 27 extends through coaxial aperture 35 to plate 31 where it is rotatably mounted therein with ball bearings 36. Drive rod 27 is slightly smaller than aperture 35 to enable the former to rotatably move therein.

A drive motor 37, located beneath table 9, rotatably drives platform 7 via a shaft 38 extending through table 9. Motor 37 also rotatably drives rod 27 via a second shaft 39 and a belt and pully mechanism shown generally at 40 and connected to the one end of rod 27.

A solenoid 41 is connected to support plate 20 for movement therewith. Extending from the solenoid 41 is a split nut assembly 42 which engages rod 27 when the solenoid 41 is energized. Adjustment mechanism 19 also is connected to assembly 42 for reasons which will be explained.

A chain and sprocket assembly shown generally at 43 is connected at one end to the top of plate 20. The other end of assembly 43 is connected to a spring 44 which in turn is connected to a vertical support 45 extending from plate 31. Spring 44 and assembly 43 retain plate 20 in the position shown when the bearing tester is not in operation.

Also shown in FIGS. 1 and 2 is an oscilloscope 46, such as a cathode ray oscilloscope, which is electrically connected via cable 47 to sensor 18. As sensor 18 traverses outer surface 3, signals are generated that are received by oscilloscope 46. These signals provide information as to any flaws on outer surface 3 and are converted into video in a well-known manner for display on the oscilloscope screen, as will be described below. The video appearing on the screen corresponds to the imperfection sensed on outer surface 3 and, thereby, enables an operator to readily determine if the inner race 2 requires repair or replacement.

FIG. 3 discloses the adjustment mechanism 19 for adjusting the probe 17 backward and forward so as to enable sensor 18 to enter the bearing between the inner race 2 and cage 4 without contacting either one. Adjustment mechanism 19 includes a holder 48 which is attached to plate 20 by an L-shaped bracket 49. A screw 50 extends through the horizontal leg of bracket 49, plate 20 and into holder 48 to securely attach the latter to plate 20. A block 51 is pivotally mounted in holder 48 via a pin 52 extending through a block 51 and connected to holder 48. A spring 53, connected above pin 52 between bracket 49 and block 51 biases the latter in a clockwise direction as viewed in FIG. 3. Another spring 54, connected above pin 52, extends through holder 48 between block 51 and assembly 42. Spring 54 overcomes the bias of spring 53 and urges block 51 in a counterclockwise direction when the solenoid 41 is energized. An adjusting screw 55 extends through a threaded aperture 56 in the vertical leg of bracket 49 and limits the clockwise movement of block 51.

The probe 17 is attached near the bottom of block 51 and extends vertically therefrom. Probe 17 may be attached in any conventional manner shown at 57 to block 51 which is made of aluminum. It thus may be seen that by adjusting the position of block 51 with adjusting screw 55, the probe 17 is adjusted in a clockwise or counterclockwise direction. In this manner, the position of probe 17 may be changed to allow it and sensor 18 to enter the bearing 1 between inner race 2 and cage 4 without touching either.

The operation of the invention shown in FIGS. 1–3 will now be described. First, the bearing 1 particularly inner race 2 is placed on rotatable platform 7 with the bearing indices 8 properly engaged against cage 4 to prevent its rotation. The operator then adjusts the lateral position of probe 17 and sensor 18 with adjustment screw 55 to enable the sensor to enter the bearing 1 between surface 3 and cage 4. Next, the operator manually lowers the vertically movable support plate 20 against the force of spring 44 with the split nut assembly 42 being disengaged at this time.

As the support plate 20 and probe 17 descend to a point where sensor 18 is just below the top lip of inner race 2, the motor 37 and solenoid 41 are automatically energized, as will be more fully described. Motor 37 then rotates inner race 2 and threaded shaft 27. At the same time, solenoid 41 causes the split nut assembly 42 to engage rod 27 and increase the tension on spring 54 to overcome the force of spring 53. Consequently, plate 20 and hence sensor 18 now descend automatically while the latter is biased against outer surface 3. The vertical movement of the sensor 18 and the rotational movement of the inner race 2 may be synchronized to enable the former to sense a given area of surface 3. When the sensor 15 reaches the lower lip of inner race 2, both the motor 37 and solenoid 41 are automatically de-energized. As will be more fully described, imperfections detected by sensor 18 on surface 3 are displayed on the oscilloscope 46.

FIG. 4 discloses in more detail the probe 17 and sensor 18. Probe 17 includes a blade 58 approximately 4 by 1/16 by 3/16 inches. Blade 58 may be milled from a sheet of stainless steel and has a groove 59, about 1/32 inches deep, extending along the entire length of blade 58, as well as a slot 60 at one end thereof.

Sensor 18 includes a barrel 61 connected at the slotted end of blades 58. Barrel 61 is approximately one-half inch long, three-sixteenths inch in diameter and has a slot 63 coinciding with slot 60 of blade 58. This slot 62 is used to reduce eddy currents. The barrel 61 is turned from a piece of standard relay core material and is silver soldered to blade 58 as shown at 63. A 0.147 inch diameter hole is drilled through the barrel 61 and on through the blade 58.

Sensor 18 also includes a cylindrical centerpiece 64 having a post 65 about one-half inches long and one-thirtysecond inches in diameter and a crown 66. The centerpiece 64 is turned from relay core material and has two No. 60 holes 67 drilled through the crown 66. The centerpiece 64 is wound to capacity with No. 40 wire 68 which passes through the holes 67 and extends 4 inches along the blade groove 59. At the end of the blade groove 59 the wire 68 is joined to heavier wire 69 for connection to oscillator 46 via cable 47. Centerpiece 64 may be pressed or force fit into barrel 61 and both the groove 59 and the wire 68 may be coated with glyptol which is a rugged insulating material. Epoxy or any similar material also may be used in lieu of glyptol.

The theory of operation in which a flaw on the outer surface 3 of inner race 2 may be detected will now be described in connection with FIG. 5 which shows part of the sensor 18 moving over a depression in the outer surface 3. When sensor 18 comes in contact with a smooth outer surface 3, a closed metallic magnetic loop is established through post 65, crown 66, barrel 61 and the outer surface 3. If, due to an irregularity in the surface 3, the barrel 61 or post 65 is not making contact with surface 3, part of the magnetic path will be through air, and the path will have a lowered ability to conduct magnetic lines of force. As a result, the inductive reactance of coil 68 is lowered. As will be more fully described below, this change in inductive reactance is measured, and a signal representing this change is generated. This signal is, after processing, received by the oscilloscope 46 which provides a picture of the irregularity. In other words, the trace on the oscilloscope screen assumes a form indicative of the variation of magnetization around the loop.

Reference will now be made to FIG. 6A which shows a block circuit diagram for providing a signal used by oscilloscope to trace a pattern corresponding to surface imperfections. An oscillator 70 is connected to a voltage divider 71 which includes the coil 68 and 180Ω resistor 68a (FIG. 7A) in series with the coil. The voltage divider 71 is connected to a detection filter 72 whose output is coupled to an amplifier 73. Amplifier 73 is, in turn, connected to an adjustable gain amplifier 74. The output of the amplifier 74 is then used to provide video on the screen of oscilloscope 46.

In operation, the oscillator 70 is turned on to emit a signal of, for example, 25 KH$_z$ which is applied to voltage divider 71. As sensor 18 contacts the surface 3 and traverses a flaw, the magnetic path described above changes and, consequently, the inductive reactance of wire or coil 68 is lowered. As a result, the signal across the 180 ohm resistor increases, resulting in a higher detected voltage.

The signal from the 180Ω resistor is filtered by detection filter 72 which provides a low frequency output signal. The low frequency signal from filter 72 is then fed to amplifier 73 for low frequency filtering. Amplifier 73 may be used, for example, to pass signals between 100 H$_z$ and 1,000 H$_z$ and may provide a voltage gain of 27. The high frequencies are attenuated by filter 72 to remove carrier frequencies. The low frequencies need to be attenuated by filter 72 in case the bearing 1 is not centered perfectly on platform 7. Also, reducing the low frequencies helps to prevent any magnetic field in the bearing 1 from affecting the output from the 180 ohm resistor.

The low frequency signal from amplifier 73 is then fed to adjustable gain amplifier 74 which clips the negative signals from the former. The output of amplifier 74 is then used, in a well-known manner, to modulate the intensity of the cathode ray beam of oscilloscope 46 to provide a trace of the imperfection on the surface 3. Consequently, any variation in the bearing surface 3 causes a bright spot on the scope which has the same shape as the bearing surface irregularity.

FIG. 6B shows a block diagram of control circuitry for automatically starting and stopping motor 37 as well as energizing solenoid 41 so as to automatically move sensor 18 vertically across the rotating surface 3. A position potentiometer 75 having a movable arm 76 is connected to an isolation amplifier 77 whose output is fed to the vertical scope deflection circuit (not shown) of oscilloscope 46. Position potentiometer 75 and movable arm 76 are located on the chain and sprocket assembly 43. As the sprocket rotates when support plate 20 descends, arm 76 rotates to vary the resistance of potentiometer 75 which is fixed mechanically. The resistance of potentiometer 75 corresponds to the vertical displacement of probe 17 and sensor 18 since the latter two also are connected to plate 20. Consequently, a signal from potentiometer 75 provides information as to the vertical position of sensor 18. As the sensor 18 moves vertically, the signal from amplifier 77 moves the scope deflection so that each horizontal sweep is just below the last sweep.

The output of amplifier 77 is also fed to start level detector 78 and stop level detector 79 which are connected to a motor control flip-flop 80 coupled to a relay 81. Relay 81 operates a normally open contact switch 82 which, when closed, allows motor 37 and solenoid 41 to be energized via a 115 VAC source. The output of start level detector 78, at the time flip-flop 80 change state, is also fed to the storage of oscilloscope 46 to erase the information from the previously tested bearing.

In the operation of FIG. 6B, as the sensor 18 is vertically lowered, the output signal from amplifier 77 is fed to start level detector 78 which has an adjustable start level provided by a variable resistor, preset in it, that corresponds to the position of the top lip of inner race 2. As the sensor 18 is lowered, the signal from amplifier 77 is fed through the variable resistor and compared with another signal in detector 78 of predetermined potential. When sensor 18 vertically descends to the top lip of inner race 2, the signal across the variable resistor falls below the predetermined potential thereby enabling detector 78 to provide an output signal. This output signal is fed to motor control flip-flop 80 which is triggered "on" to energize relay 81. Relay 81 then close contact switch 82 thereby starting motor 37 and energizing solenoid 41. Consequently, drive rod 27 rotates and split nut assembly 42 engages the rod to automatically lower sensor 18. In addition, the tension on spring 54 is increased to move sensor 18 against surface 3.

In order to automatically stop the motor 37 and deenergize solenoid 41 when the sensor 18 reaches the bottom lip of inner race 2, stop level detector 79 is provided with a preset, adjustable threshold level corresponding to the vertical position of such bottom lip. As sensor 18 reaches the bottom lip, the output signal of amplifier 77 falls below the threshold preset in detector 79. As a result, stop level detector 79 provides an output signal that trigges motor control flip-flop 80 "off" to deenergize relay 81 and open contact switch 82.

If it is desired to inspect, for example, only the middle portion of the surface 3, it is only necessary to adjust the variable resistor and threshold level in the level detectors 78, 79, respectively. This may be accomplished by reducing the voltage drop in the start level detector 78 and raising the threshold in stop level detector 79.

Figure 6C:
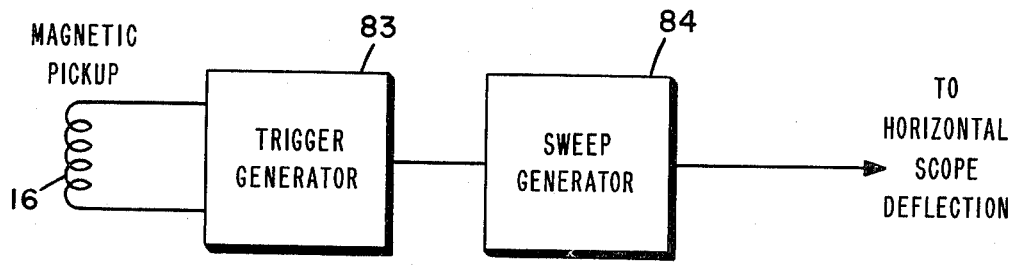

FIG. 6C discloses a block diagram for controlling horizontal sweep of the oscilloscope 46. Magnetic pickup 16, located underneath table 9, is connected to a trigger generator 83 which is coupled to a sweep generator 84. As the magnetic protrusion 15 rotates with inner race 2, its passage is sensed by pickup 16 which generates a signal for each revolution of the race. The signal is fed to trigger generator 83 which provides a trigger pulse used to initiate the horizontal sweep via sweep generator 84. Thus, not only is there one horizontal sweep of the scope for each revolution of the race, but each sweep starts at the same rotational position of the race.

Figure 7C:
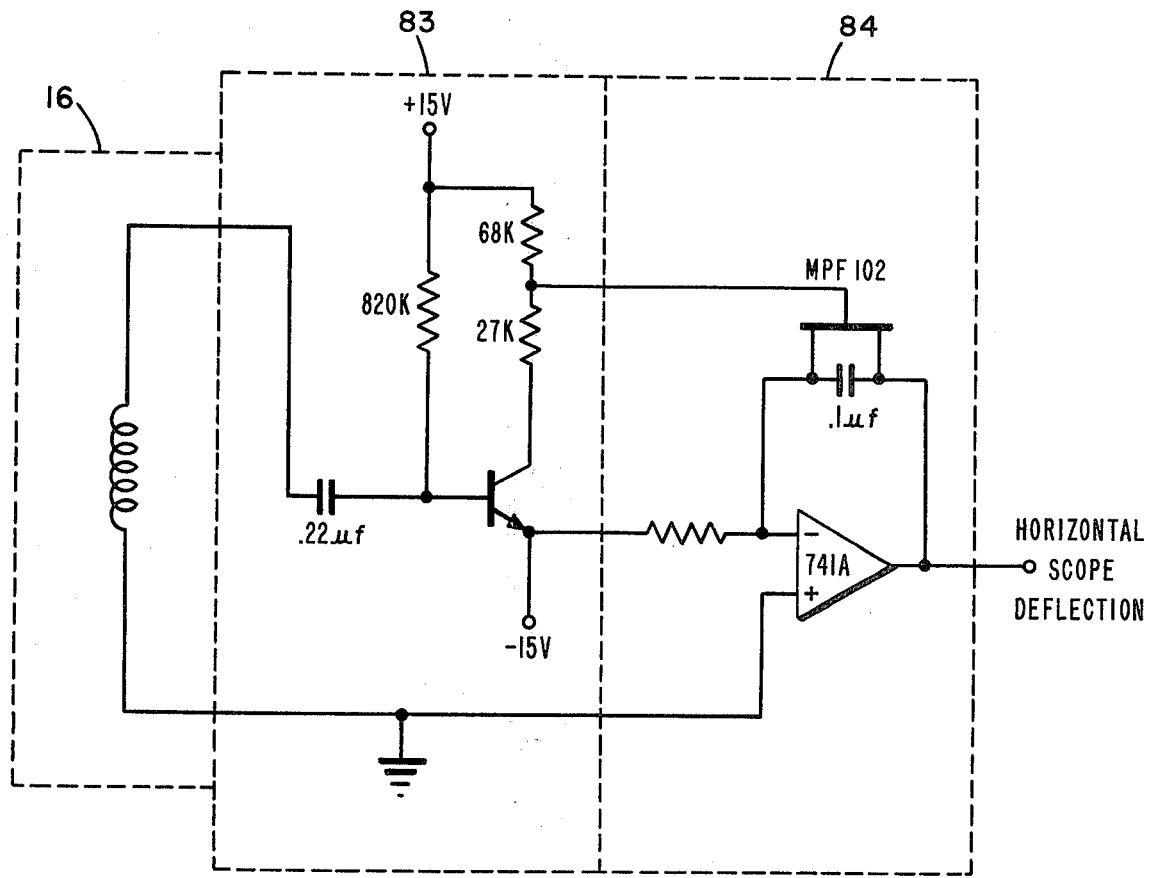
Figure 7B:
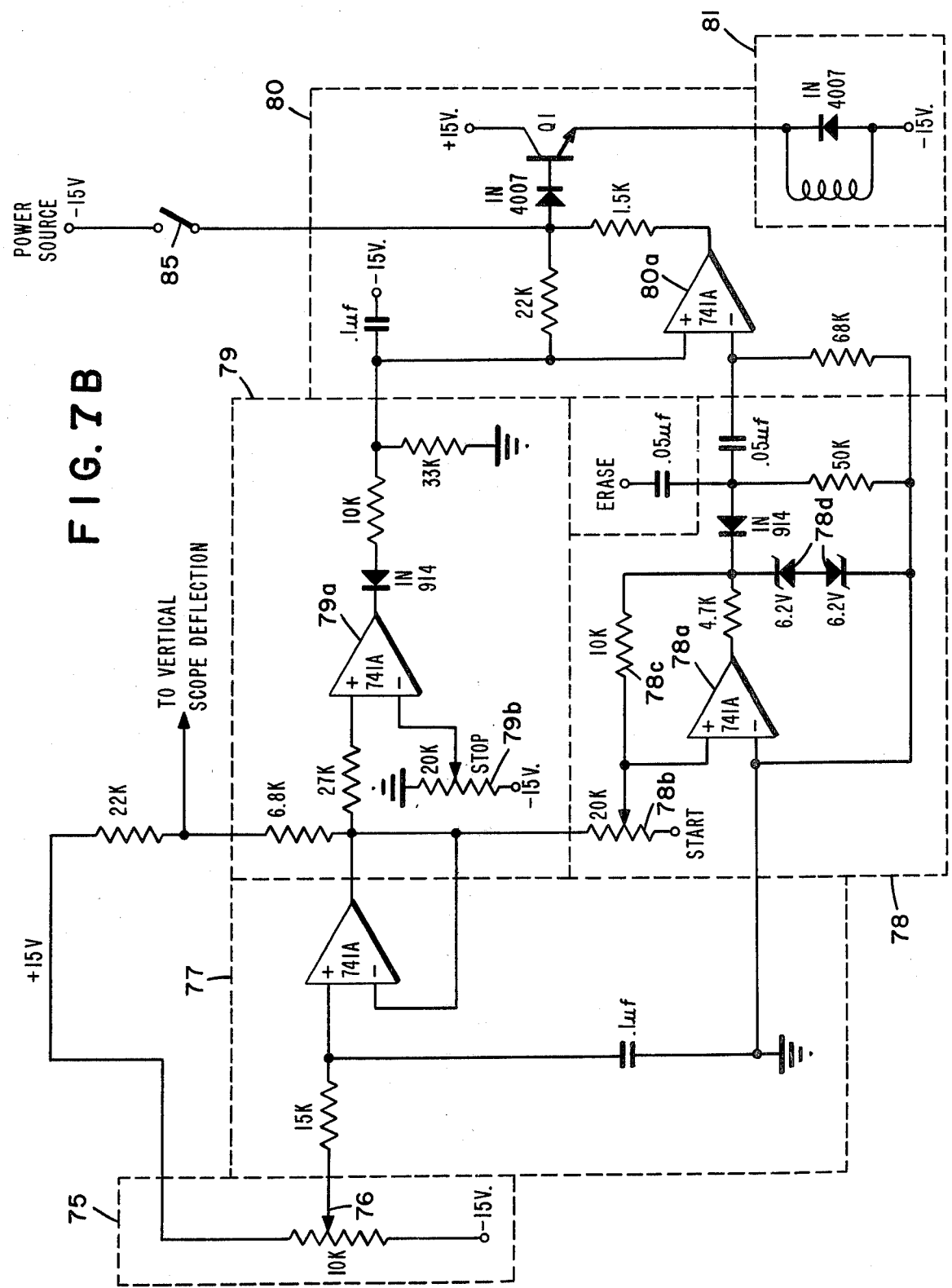

FIGS. 7A, 7B and 7C disclose schematic diagrams of FIGS. 6A, 6B and 6C, with those elements in the former corresponding to the blocks of the latter shown in dashed lines. The operation of this circuitry need not be described in detail as it would be well known to one skilled in the art; however, certain features will be specifically noted to highlight the structure.

As is shown in FIG. 7B, there are several operational amplifiers 78a, 79a used in the start level detector 78 and stop level detector 79, respectively. Each amplifier 78a, 79a has one input that may be adjusted by presetting the "START" variable resistor 78b and the "STOP" adjustable potentiometer 79b. The setting of resistor 78b and potentiometer 79b provides the means for automatically starting and stopping vertical movement of the probe 17.

As to the start level detector 78, the output signal from the operational amplifier 78a is fed back across the 10k resistor 78c to provide a fixed potential controlled by the two Zener diodes 78d. The output signal from isolation amplifier 77 is applied to the variable resistor 78b and as the potential across the resistor is compared with and drops below the potential of the feedback signal, the positive (+) terminal of amplifier 78a becomes negative with respect to the negative (−) terminal. This change of state of the amplifier 78a results in a pulse being applied to amplifier 80a. This pulse causes amplifier 80a to lock to the on position so that transistor Q1 becomes conductive thereby energizing relay 81 to close contact switch 82 shown in FIG. 6B.

The potential across the potentiometer 79b is applied to the negative (−) input of the operational amplifier 79a. The output signal from isolation amplifier 77 is also fed to the positive (+) terminal of this amplifier. When the potential of this output signal drops below the potential across the negative (−) terminal, amplifier 79a changes state. As a result, amplifier 80a locks to the off position causing transistor Q1 to become non-conductive, thereby deenergizing relay 81 and opening switch 82.

A normally open stop switch 85 shown in FIGS. 6B and 7B also is connected to motor control flip-flop 80 and may be used to stop the bearing tester in mid-operation. By closing the switch 85, the amplifier 80a is locked to the off position and the transistor Q1 becomes non-conductive, thereby deenergizing relay 81.

The power source shown connected to switch 85 may be used to supply the various potentials shown in the drawings.

What is claimed is:

1. Apparatus for detecting flaws in a surface of a large roller bearing having an inner race, a cage spaced apart form and concentric about the inner race, and a plurality of rollers connected to the cage and abutting the outer surface of the inner race, comprising:

a. a probe including a sensor facing towards and in contact with the outer surface of the inner race, said sensor including means for providing a magnetic field having magnetic lines of force in a loop about said sensor and the inner race, said sensor having an inductive reactance which is proportional to the number of magnetic lines of force in the loop;

b. first means for moving said probe with respect to the roller bearing to enable said sensor to be positioned between the outer surface of the inner race and the cage;

c. second means for automatically moving said sensor vertically across the outer surface of the inner race including a motor connected to said probe, means for providing a signal corresponding to the vertical position of said probe, means connected to said providing means for energizing said motor when said probe is at a first vertical position with respect to the roller bearing, and means connected to said providing means for deenergizing said motor when said probe is at a second vertical position with respect to the roller bearing lower than the first vertical position;

d. means for rotating the roller bearing about a vertical axis, including said motor;

e. means for determining a change in inductive reactance of said sensor when said sensor moves across a flaw in the outer surface of the inner race providing an air gap between said sensor and the outer surface; and f. means connected to said determining means, for displaying information corresponding to the condition of the outer surface.

2. Apparatus according to claim 1 wherein said means for energizing and said means for deenergizing comprise signal level comparators having respective preset thresholds representing the first and second positions, respectively, said signal from said providing means being compared to said thresholds.

3. Apparatus according to claim 2 wherein said comparators include means for changing said thresholds to vary the vertical positions of said probe at which said motor is energized and deenergized.

4. Apparatus according to claim 3 wherein said second means for automatically moving comprises a rotatable drive rod driven by said motor, means rotatably mounting said drive rod to said motor, a support plate having an aperture through which said drive rod extends and for moving vertically along said rod, said first means for moving connecting said probe to said supporting plate, a solenoid energized by said motor energizing means and connected to said plate, and means, connected to said solenoid and operated by said solenoid when said solenoid is energized, for engaging said drive rod and vertically moving said support plate.

5. Apparatus according to claim 4 wherein said first means for moving comprises means pivotally mounting said probe about a horizontal axis, and third means for moving said mounting means about the horizontal axis.

* * * * *